(12) United States Patent
Tanaka et al.

(10) Patent No.: US 6,912,863 B2
(45) Date of Patent: Jul. 5, 2005

(54) COOLING STRUCTURE FOR COOLING VEHICLE ELECTRONIC UNIT

(75) Inventors: Hisashi Tanaka, Anjo (JP); Haruki Ikuta, Hekinan (JP); Koichi Ito, Handa (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/652,447

(22) Filed: Aug. 29, 2003

(65) Prior Publication Data

US 2004/0074248 A1 Apr. 22, 2004

(30) Foreign Application Priority Data

Aug. 30, 2002 (JP) .................................... 2002-253965
Oct. 25, 2002 (JP) .................................... 2002-311262
Mar. 24, 2003 (JP) .................................... 2003-080414

(51) Int. Cl.[7] ............................................. B60H 1/32
(52) U.S. Cl. ..................... 62/244; 280/728.2; 280/779; 296/70
(58) Field of Search ................ 62/244, 298; 280/728.2, 280/779; 296/70

(56) References Cited

U.S. PATENT DOCUMENTS 5,082,078 A * 1/1992 Umeda et al. ................ 180/90
5,088,571 A * 2/1992 Burry et al. ................... 180/90
5,222,372 A * 6/1993 DeRees et al. ................ 62/237
5,470,099 A * 11/1995 Williams .................. 280/728.2
6,464,249 B1 * 10/2002 Lacroix ....................... 280/729

FOREIGN PATENT DOCUMENTS

JP        2001-163031        6/2001

* cited by examiner

Primary Examiner—William E. Tapolcai
(74) Attorney, Agent, or Firm—Harness, Dickey & Pierce, PLC

(57) ABSTRACT

A vehicle air conditioner includes an air conditioning case, a blower fan for blowing conditioned air into a passenger compartment, and an evaporator disposed in the air conditioning case. The air conditioning case has a cooling opening upstream from the evaporator, so that at least inside air is blown by the blower fan to vehicle electronic units through the cooling opening. Thus, heat radiation of the electronic units can be facilitated by air blown from the blower fan. Further, because at least inside air, without being cooled by the evaporator, is blown to the electronic units, the electronic units can be prevented from being excessively cooled. Accordingly, it can restrict the surface temperature of the electronic units from reducing less than a dew point, thereby effectively reducing condensed water on the electronic units.

26 Claims, 14 Drawing Sheets

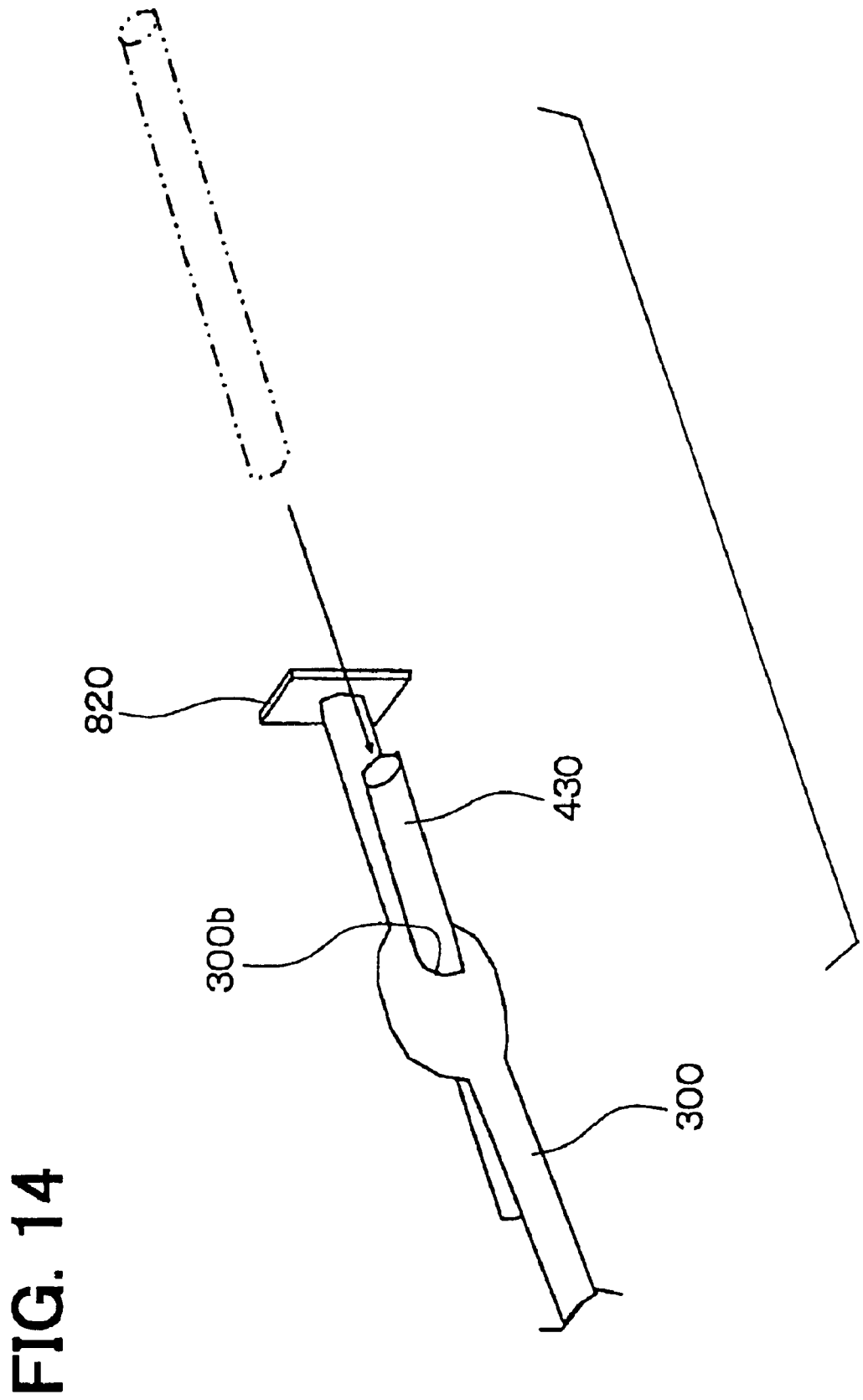

COOLING STRUCTURE FOR COOLING VEHICLE ELECTRONIC UNIT

CROSS-REFERENCE TO RELATED APPLICATION

This application is related to and claims priority from Japanese Patent Applications No. 2002-253965 filed on Aug. 30, 2002, No. 2002-311262 filed on Oct. 25, 2002, and No. 2003-80414 filed on Mar. 24, 2003, the contents of which are hereby incorporated by reference.

BACKGROUND OF THE INVENTION

1. Field of the Invention

The present invention relates to a cooling structure for cooling a vehicle electronic unit, and a module structure of vehicle cockpit components.

2. Description of Related Art

Generally, an electronic member having a high thermal resistance is used for a heat-generation electronic unit such as an integrated circuit (IC) chip mounted in a vehicle. Alternatively, a heat sink or a cooling fan is provided to only cool the heat-generation electronic unit. The electronic unit maybe cooled by air blown from a vehicle air conditioner. However, if the air from the vehicle air conditioner is simply blown to the electronic unit for cooling the electronic unit, a dew point of the electronic unit is reduced, and moisture is condensed on the electronic unit. Therefore, the electronic unit may fail, and may be short-circuited, for example. Further, in a case where the vehicle air conditioner is operated in an outside-air introduction mode in the winter, low-temperature outside air is blown to the electronic unit, and thereby readily generating condensed water on the electronic unit.

On the other hand, in a module structure disclosed in JP-A-2001-163031, cockpit components such as a display unit, a meter unit, a dashboard, a steering support member, an air bag unit, an air conditioning unit, an air-conditioning duct and their peripheral members are beforehand assembled together to be modularized in a sub-assembly line. Then, the modularized body of the cockpit components is assembled to a vehicle, thereby reducing assembly time in a vehicle assembly line. Generally, the display unit, the meter unit and the dashboard are used for forming the design in a passenger compartment of the vehicle. Further, in many cases, the design of such cockpit components is changed for every vehicle type, and for every vehicle grade such as standard specification and deluxe specification even in the same vehicle type. On the other hand, the air bag unit and the air conditioning unit are not used for forming the design in the passenger compartment. Therefore, the same structure of the air bag unit or the air conditioning unit may be used in common for many vehicle types and for many vehicle grades. However, the air bag unit is designed in accordance with a condition such as a vertical dimension and a lateral dimension of a vehicle seat, but the structure of the air conditioning unit is not changed by this condition. Accordingly, in many cases, the structure of the air bag unit is changed for every vehicle type and the like, while the same structure of the air conditioning unit can be used in common for many vehicle types, and for many vehicle grades. In some cases, the same design of the air conditioning unit can be commonly used for different vehicle makers. Thus, if the cockpit components are simply modularized, that is, if cockpit components necessary to change its design and cockpit components unnecessary to change its design are modularized as a single module structure, the module structure is required to be changed for every vehicle grade or every vehicle type.

SUMMARY OF THE INVENTION

In view of the above-described problems, it is a first object of the present invention to provide a cooling structure capable of cooling a vehicle electronic unit while effectively restricting condensed water from being generated on the vehicle electronic unit.

It is a second object of the present invention to provide a module structure of vehicle cockpit components capable of reducing its design change.

According to a first aspect of the present invention, a cooling structure for cooling a vehicle electronic unit includes an air conditioning case for defining an air passage through which air flows into a passenger compartment of the vehicle, a blower for blowing air introduced from at least one of an inside-air introduction port and an outside-air introduction port of the air conditioning case into the passenger compartment, and a cooling heat exchanger disposed in the air conditioning case for cooling air blown by the blower. In the cooling structure, the air conditioning case has a cooling opening at a position upstream from the cooling heat exchanger, and the cooling opening is provided in the air conditioning case such that air including at least inside air is blown from the cooling opening to the electronic unit by the blower. Accordingly, heat radiation of the vehicle electronic unit can be facilitated by the blower of the vehicle air conditioner. Therefore, an electronic unit having low-thermal resistance can be adopted, and cost of the vehicle electronic unit can be reduced. Furthermore, because only the air including inside air, without being cooled by the cooling heat exchanger, is blown to the electronic unit. Therefore, the electronic unit can be prevented from being excessively cooled, and the surface temperature of the vehicle electronic unit can be restricted from reducing less than the dew point. Thus, it can effectively restrict condensed water from being generated on the electronic unit.

Preferably, the inside-air introduction port is constructed of first and second inside-air introduction ports, and the air conditioning case has a partition member for partitioning the air passage into a first air passage through which air from the first inside-air introduction port and the outside-air introduction port flows into the passenger compartment, and a second air passage through which air from the second inside-air introduction port flows to the electronic unit and the passenger compartment. For example, the blower includes a first fan disposed in the first air passage, and a second fan disposed in the second air passage. In this case, only inside air can be introduced to the vehicle electronic unit. Therefore, it can prevent the vehicle electronic unit from being excessively reduced in the winter.

According to a second aspect of the present invention, a module structure of vehicle cockpit components includes: a function module assembly formed by modularizing an air conditioning unit and a peripheral member of the air conditioning unit, the air conditioning unit being for adjusting an air temperature and for blowing the adjusted air into a passenger compartment of the vehicle; a structure module assembly formed by modularizing a steering support member for supporting a steering shaft, and the air bag unit for protecting a passenger in a vehicle collision; and a design module assembly formed by modularizing a dashboard and at least one of a display unit and a meter unit in the vehicle. Accordingly, the vehicle cockpit components are divided into at least three module assemblies of the function module assembly, the structure module assembly and the design module assembly. Therefore, it is possible to change only the design of the design module assembly for every vehicle grade, and the same design of the function module assembly and the same design of the structure module assembly can be commonly used for many vehicle grades. Further, in some cases, only the design of the design module assembly and the design of the structure module assembly can be changed for every vehicle type, and the function module assembly can be commonly used for many vehicle types. Thus, the module structure of the vehicle cockpit components is constructed so as to simplify its design change. Further, the vehicle cockpit components such as the display unit, the meter unit, the dashboard, the steering support member, the air bag unit, the air conditioning unit and its peripheral part are divided into the above three module assemblies. Therefore, in the vehicle assembly line, assembly time can be reduced as compared with a case where the vehicle cockpit components are assembled to a vehicle one by one.

BRIEF DESCRIPTION OF THE DRAWINGS

Additional objects and advantages of the present invention will be more readily apparent from the following detailed description of preferred embodiments when taken together with the accompanying drawings, in which:

FIG. 14 is a perspective view showing a steering support member and a steering shaft inserted into the steering support member, according to a sixth embodiment of the present invention.

DETAILED DESCRIPTION OF THE PRESENTLY PREFERRED EMBODIMENTS

Figure 1:
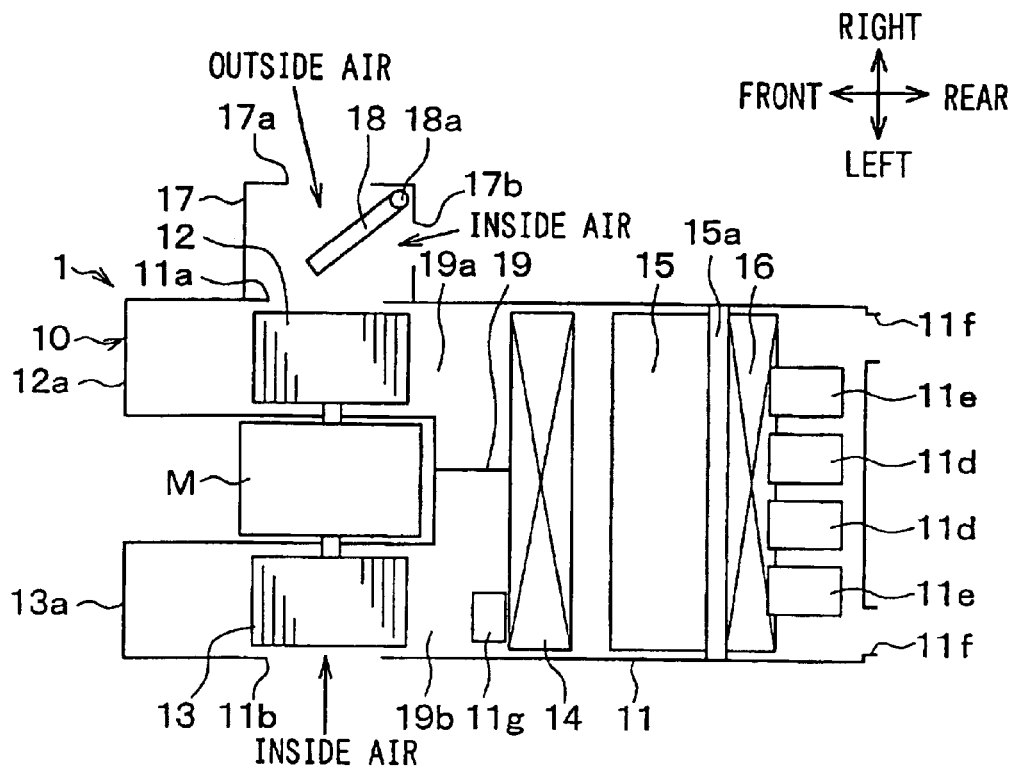
FIG. 1 is a schematic diagram showing an interior unit including an air conditioning unit and a blower unit in a vehicle air conditioner, when being viewed from an upper side, according to a first embodiment of the present invention.
Figure 2:
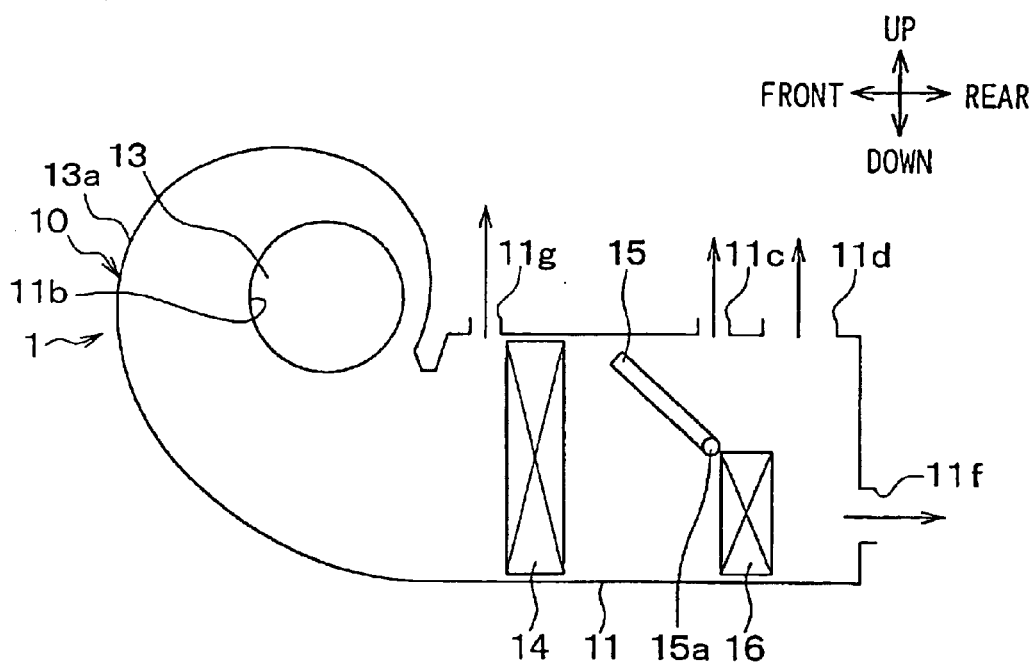
FIG. 2 is a schematic diagram showing the interior unit when being viewed from a side, according to the first embodiment.

Preferred embodiments of the present invention will be described hereinafter with reference to the appended drawings.

(First Embodiment)

The first embodiment of the present invention will be now described with reference to FIGS. 1–6. In the first embodiment, a vehicle air conditioner 1 includes an interior unit 10 shown in FIGS. 1, 2. The interior unit 10 is disposed inside a dashboard positioned on a front side in a passenger compartment, substantially at a center area in a vehicle right-left direction. The vehicle air conditioner 1 is mounted in a vehicle in the arrangement of FIGS. 1, 2 in the vehicle right-left direction, in a vehicle front-rear direction and in a vehicle up-down direction. The interior unit 10 of the vehicle air conditioner 1 is constructed with a blower unit and an air conditioning unit. The blower unit includes a blower and the like, and the air conditioning unit includes a heat exchanger and the like. The blower unit and the air conditioning unit are integrated to each other to construct the interior unit 10. The interior unit (air conditioning unit) 10 includes a resinous air conditioning case 11 forming an air passage through which air flows into the passenger compartment. In the air passage of the air conditioning case 11, first and second blower fans 12, 13 of the blower, an evaporator 14 as a cooling heat exchanger, an air mixing door 15 as a temperature adjusting device, and a heater core 16 as a heating heat exchanger are provided from an upstream air side to a downstream air side, in this order.

The air mixing door 15 includes a rotation shaft 15a rotatably attached to the air conditioning case 11. The air mixing door 15 adjusts a mixing flow ratio between air passing through the heater core 16 and air bypassing the heater core 16 by adjusting its rotational angle. Thus, the air mixing door 15 adjusts a temperature of air to be blown into the passenger compartment. The evaporator 14 cools air by evaporating refrigerant circulated in a refrigerant cycle, and the heater core 16 heats air by using hot water from a vehicle engine as a heat source.

The air conditioning case 11 includes first and second fan casings 12a, 13a, and the first and second blower fans 12, 13 are disposed in the first and second fan casings 12a, 13a, respectively. The first and second fan casings 12a, 13a have first and second air suction ports 11a, 11b from which air is sucked by the first and second blower fans 12, 13, respectively. The first and second blower fans 12, 13 are driven by a common electric motor (blower motor) M. Accordingly, the blower is constructed with the first and second blower fans 12, 13, the first and second fan casings 12a, 13a, and the electric motor (blower motor) M. The blower is a centrifugal type blower.

Further, the air conditioning case 11 includes an inside-outside air switching case 17 upstream from the first air suction port 11a of the first fan casing 12a. The inside-outside air switching case 17 has an outside-air introduction port 17a through which outside air outside the passenger compartment is introduced, and a first inside-air introduction port 17b through which inside air inside the passenger compartment is introduced. An inside-outside air switching door 18 is provided in the air switching case 17, and includes a rotation shaft 18a rotatably attached to the air switching case 17. The air switching door 18 is rotated, thereby selectively opening and closing the outside-air introduction port 17a and the first inside-air introduction port 17b. In the first embodiment, the second air suction port 11b provided in the second fan casing 13a is used as a second inside-air introduction port through which inside air is introduced.

In the air conditioning case 11, the air passage upstream of the evaporator 14 is partitioned by a partition plate 19 into a first air passage 19a and a second air passage 19b. The first blower fan 12 is disposed in the first air passage 19a, and the second blower fan 13 is disposed in the second air passage 19b. The air conditioning case 11 has a defroster opening 11c, center face openings 11d, side face openings 11e and foot openings 11f at positions downstream of the heater core 16. Further, the air conditioning case 11 has a cooling opening 11g for cooling an electronic unit, upstream of the evaporator 14 in the second air passage 19b.

Figure 3:
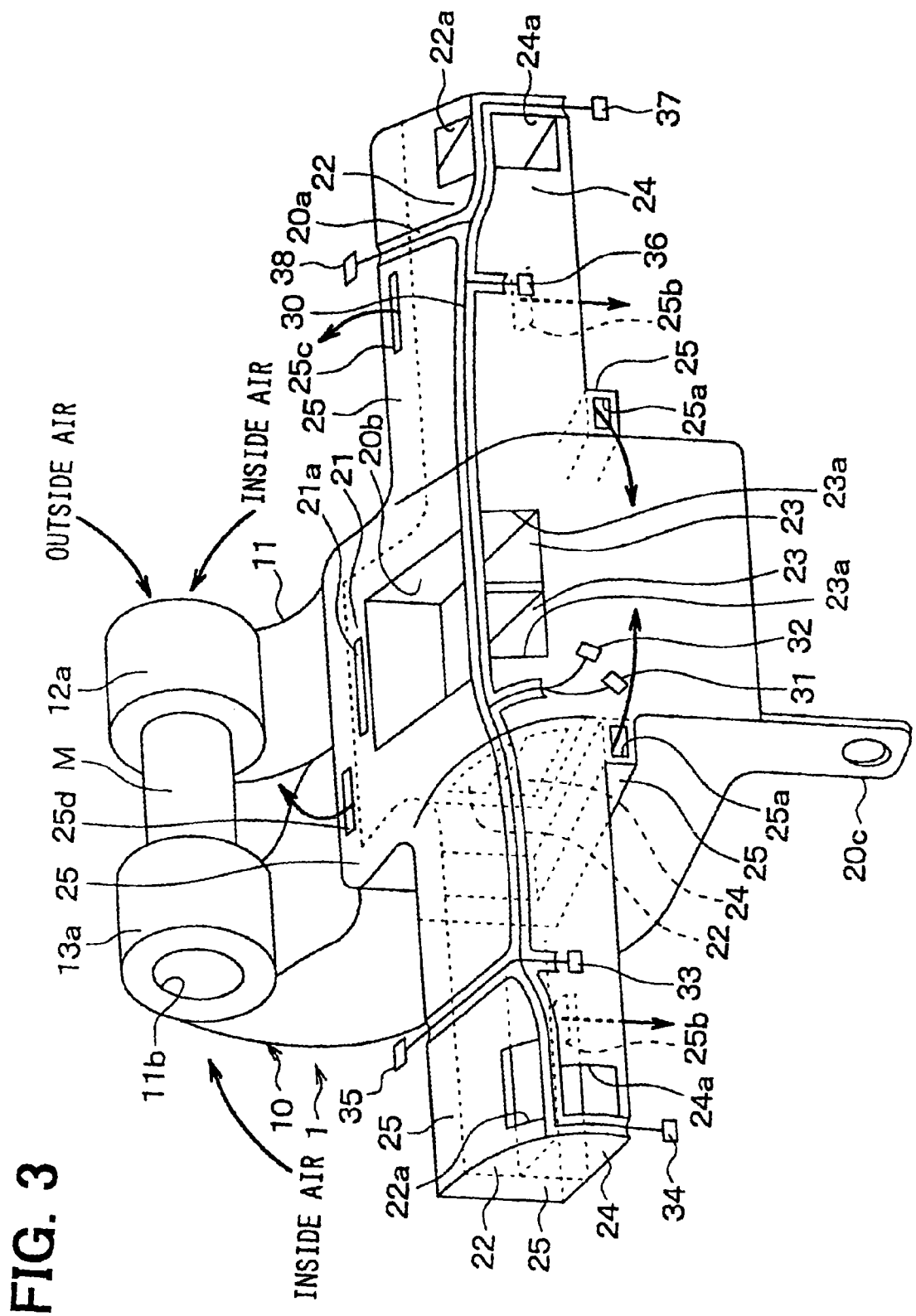
FIG. 3 is a perspective view showing a connection state between the interior unit and air ducts, in the vehicle air conditioner, according to the first embodiment.

As shown in FIG. 3, air ducts 21–25 are provided to be connected to the air conditioning unit 10. Specifically, a center defroster duct 21 and a side defroster duct 22 are connected to the defroster opening 11c. A center face duct 23 is connected to the center face openings 11d, and a side face duct 24 is connected to the side face openings 11. Further, a cooling duct 25 is connected to the cooling opening 11g for cooling the electronic unit. In the first embodiment, the air ducts 21–25 are integrally formed from resin to reduce the number of components. Further, the air ducts 21–25 may be integrated to the air conditioning case 11 to further reduce the number of components. The center defroster duct 21 has a center-defroster blowing port 21a from which conditioned air is blown toward a front windshield, and the side defroster duct 22 has a side-defroster blowing port 22a from which conditioned air is blown toward a side windshield. The center face duct 23 and the side face duct 24 have a center-face blowing port 23a and a side-face blowing port 24a for blowing conditioned air toward the upper half body of a passenger in the passenger compartment, respectively. The cooling duct 25 has plural blowing ports 25a–25d from which at least inside air upstream from the evaporator 14 is blown toward the electronic unit for cooling the electronic unit.

Figure 4:
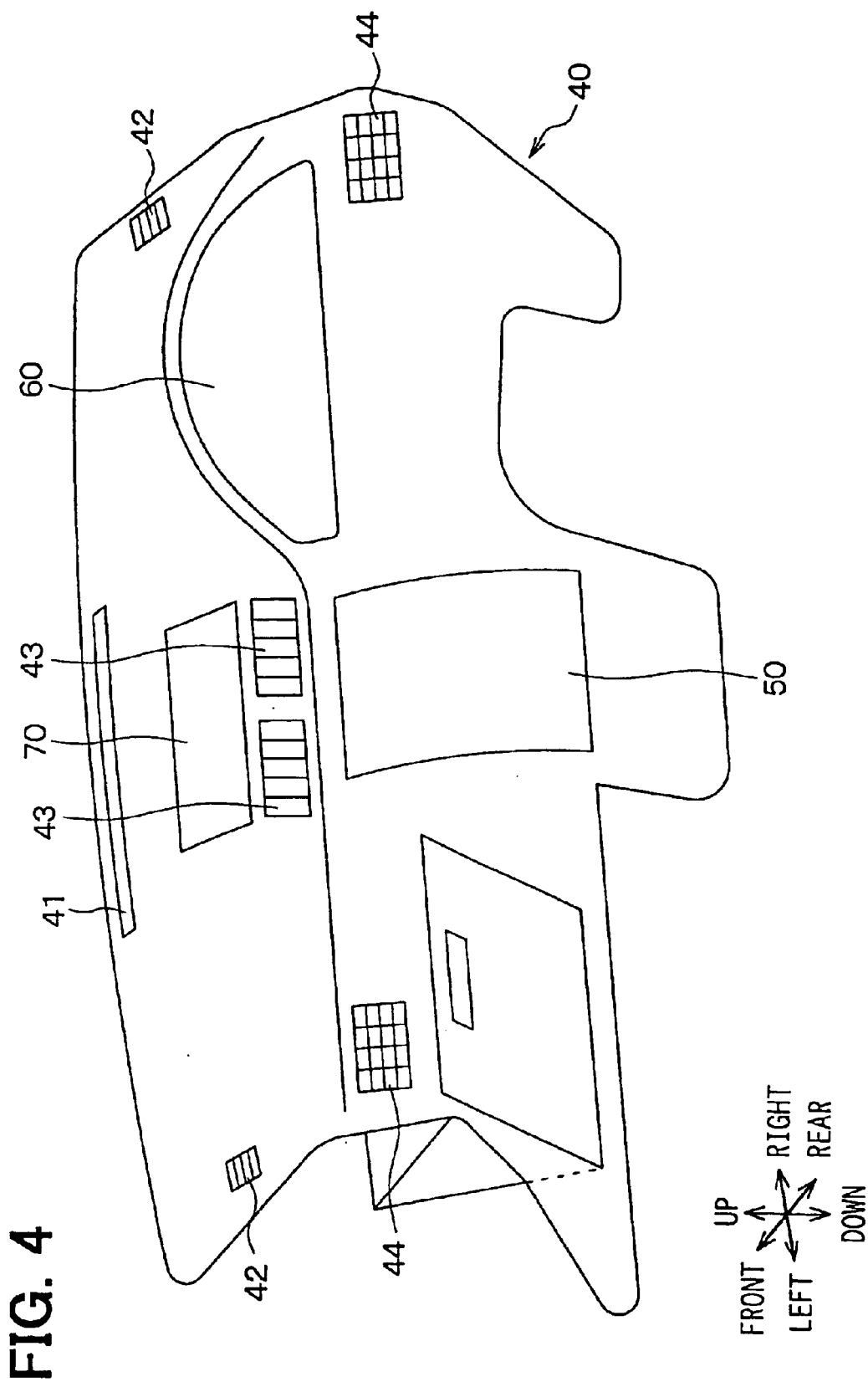
FIG. 4 is a perspective view showing a dashboard to which the vehicle air conditioner shown in FIG. 3 is assembled.

As shown in FIG. 3, a circuit ditch 20a is formed on the air ducts 21–25, and a wire harness 30 is disposed in the circuit ditch 20a. As shown in FIG. 4, a dashboard 40 is disposed so as to cover the air conditioner 1 from the passenger compartment. In the first embodiment, the dashboard 40 and the air conditioner 1 are assembled together to form a module structure in a sub-assembly line different from a vehicle assembly line. Then, the module structure is assembled to a vehicle in the vehicle assembly line, thereby reducing the number of assembly processes in the vehicle assembly line. In FIG. 3, a brace member 20c is attached to the vehicle, and supports the air conditioning unit 10 at its lower side. In the first embodiment, the brace member 20c and the air conditioning case 11 are integrally molded by using resin to reduce the number of components.

As shown in FIG. 4, the dashboard 40 has a center defroster grill 41, a side defroster grill 42, a center face grill 43 and a side face grill 44. The center-defroster blowing port 21a is provided with the center defroster grill 41, and the side-defroster blowing port 22a is provided with the side defroster grill 42. The center-face blowing port 23a is provided with the center face grill 43, and the side-face blowing port 24a is provided with the side face grill 44. Further, an audio system, a navigation unit, an air-conditioning operational panel, an electrical unit 50, a meter unit 60, a display unit 70 and the like are provided in the dashboard 40. The electrical unit 50 is disposed substantially at a center area in the vehicle right-left direction, and the meter unit 60 is disposed at the front of a driver seat. The display unit 70 is disposed at an upper side of the electrical unit 50, and is fitted into a concave portion 20b provided on the air ducts 21–25 shown in FIG. 3. Further, an electronic control unit (ECU), having electronic members such as integrated circuit (IC) chips, is provided in the electrical unit 50, the meter unit 60 and the display unit 70. Here, the electronic members, provided in the electrical unit 50, the meter unit 60 and the display unit 70, generate a large heat when being operated.

As shown in FIG. 3, the wire harness 30 has connectors 31–38. Specifically, the connector 31 is connected to the interior unit 10 of the air conditioner 1, and the connector 32 is connected to the electrical unit 50. The connectors 34, 37 are connected to a junction box (not shown), and the connector 35 is connected to an air bag unit (not shown). The connector 38 is connected to the meter unit 60, and the connectors 33, 36 are connected to electronic units having high heat-generation electronic members such as a body system ECU (not shown). The blowing port 25a of the cooling duct 25 is provided for blowing the inside air to the electrical unit 50, and the blowing port 25b of the cooling duct 25 is provided for blowing the inside air to the body system ECU. The blowing port 25c of the cooling duct 25 is provided for blowing the inside air to the meter unit 60, and the blowing port 25d of the cooling duct 25 is provided for blowing the inside air to the display unit 70. Thus, the high heat-generation electronic members provided in the electrical unit 50, the body system ECU, the meter unit 60 and the display unit 70 are cooled by using the inside air blown from the blowing ports 25a–25d.

Figure 5:
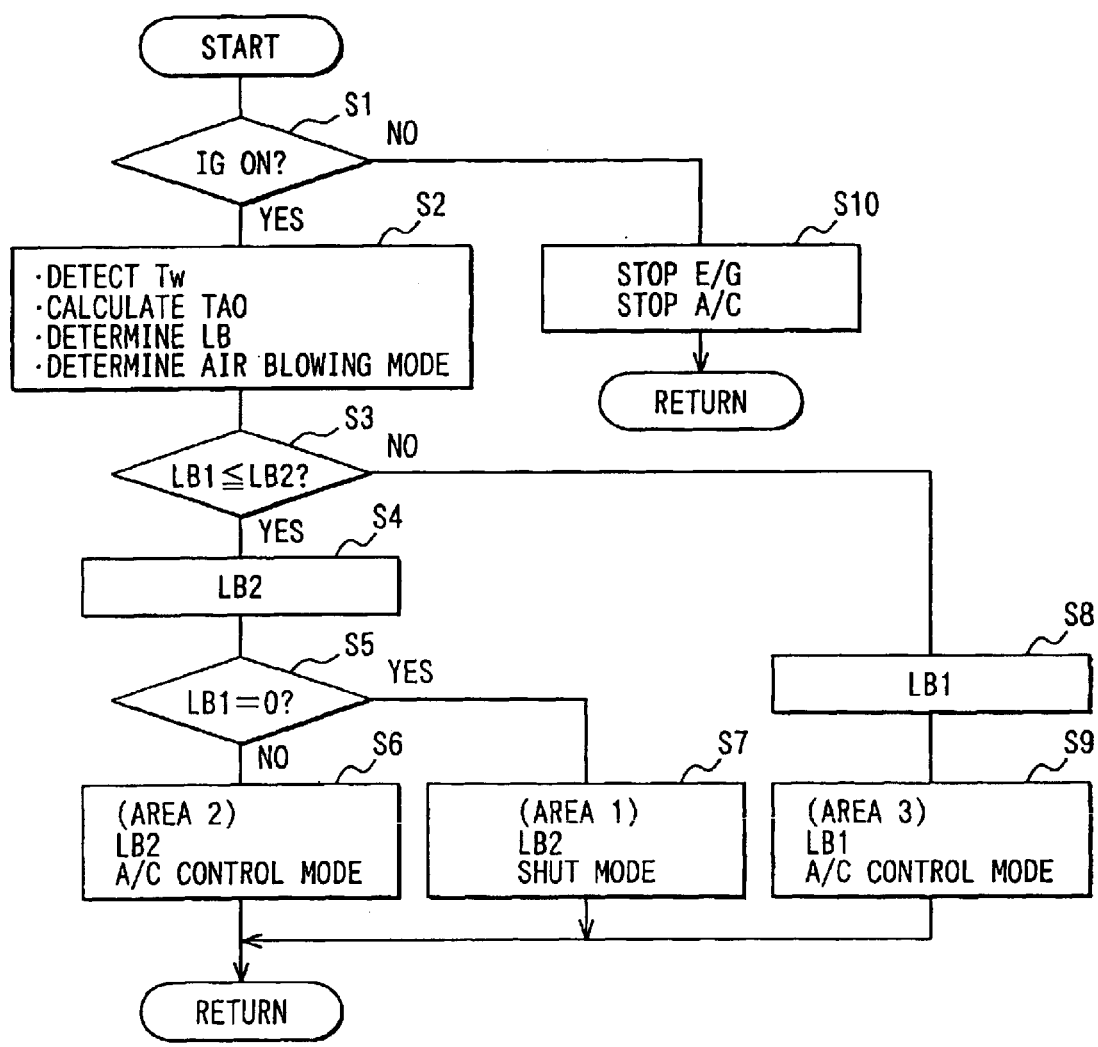
FIG. 5 is a flow diagram showing a control process of an electronic control unit (ECU) of the vehicle air conditioner, according to the first embodiment.

Next, control operation of an ECU (not shown) provided in the air conditioner 1 will be described. As shown in FIG. 5, it is determined at step S1 whether an ignition switch (IG) is turned on or not. When the determination at step S1 is YES, that is, when the ignition switch (IG) is determined to be turned on, it proceeds to step S2. At step S2, a water temperature TW flowing in the heater core 16 is detected, a target air temperature TAO to be blown into the passenger compartment is calculated, an air blowing level LB is determined, and an air blowing mode is determined. The target air temperature TAO is calculated based on a temperature set by using the air-conditioning panel, a solar radiation amount entering to the passenger compartment, an outside air temperature, an inside air temperature and the like.

Further, a defroster blowing mode, a face blowing mode, foot blowing mode and the like are set as the air blowing mode. Conditioned air is blown only from the center defroster grill 41 and the side defroster grill 42 in the defroster blowing mode, and conditioned air is blown only from the center face grill 43 and the side face grill 44 in the face blowing mode. Further, conditioned air is mainly blown from the foot opening 11f, in the foot blowing mode. In all of the air blowing modes, the cooling opening 11g is always opened, so that inside air is blown to the electronic units 50,

60, 70 having the electronic members with high heat generation. Further, in the first embodiment, all of the openings 11c, 11d, 11e, 11f can be closed while the cooling opening 11g is opened. In this case, a shut mode can be selected. The air blowing modes except for the shut mode are defined as an air-conditioning mode. When the air blowing mode is automatically controlled, the air blowing mode is selected, based on the target air temperature TAO, in the air-conditioning mode. In the shut mode, the outside-air introduction port 17a is closed by the switching door 18, and the first inside-air introduction port 17b is opened by the switching door 18. At this time, the operation of the refrigerant cycle is stopped, and hot water circulation in the heater core 16 is stopped.

When the air blowing amount is automatically controlled, the air blowing level LB is determined in accordance with a basic control or a warm-up control described later. In the winter, the water temperature TW may be equal to or lower than a predetermined temperature directly after start operation of a vehicle engine. In this condition, when the blower is operated in heating operation, cold air is blown into the passenger compartment. Therefore, when the water temperature TW is equal to or lower than a first predetermined temperature (e.g., 30° C.), the warm-up control is performed. Specifically, in the warm-up control, air is not blown into the passenger compartment when the water temperature TW is equal to or lower than the first predetermined temperature. On the other hand, when the water temperature TW is higher than the first predetermined temperature directly after the start operation of the vehicle engine, the basic control is performed. In the basic control, an air blowing level LB1 required for the air-conditioning of the passenger compartment is determined in accordance with the target air temperature TAO. That is, when the target air temperature TAO is in a temperature area corresponding to an intermediate season except for the summer and the winter, the air blowing level LB1 is set at the minimum value. When the target air temperature TAO becomes outside the temperature area and is separated from the temperature area, the air blowing level LB1 is gradually increased. Then, when the target air temperature TAO reaches an upper limit temperature or a lower limit temperature, the air blowing level LB1 is set at its maximum value.

Even when a switch for starting the operation of the air conditioner 1 is not turned on, the electronic units 50, 60, 70 are required to be cooled by using inside air blown by the air conditioner 1. Accordingly, in the first embodiment, even when the switch for starting the operation of the air conditioner 1 is not turned on, the blower motor M is driven. Further, an air blowing level LB2 required for cooling the electronic units 50, 60, 70 is predetermined. When the air blowing level LB1 required for performing air-conditioning of the passenger compartment is equal to or lower than the air blowing level LB2, the blower motor M is operated so that the air blowing level LB becomes the air blowing level LB2. When the air blowing level LB1 is higher than the air blowing level LB2, the blower motor M is operated so that the air blowing level LB is set at the air blowing level LB1. Specifically, the control processes at steps S3–9 shown in FIG. 5 are performed, thereby performing the warm-up control and the basic control. More specifically, it is determined at step S3 whether the air blowing level LB1 required for the air-conditioning of the passenger compartment is equal to or lower than the air blowing level LB2 required for cooling the electronic units 50, 60, 70, or not. When the determination at step S3 is YES (LB1≦LB2), the air blowing amount of the blower is determined based on the air blowing level LB2 at step S4. Then, it is determined at step S5 whether the air blowing level LB1 is zero due to the warm-up control, or not.

Figure 6:
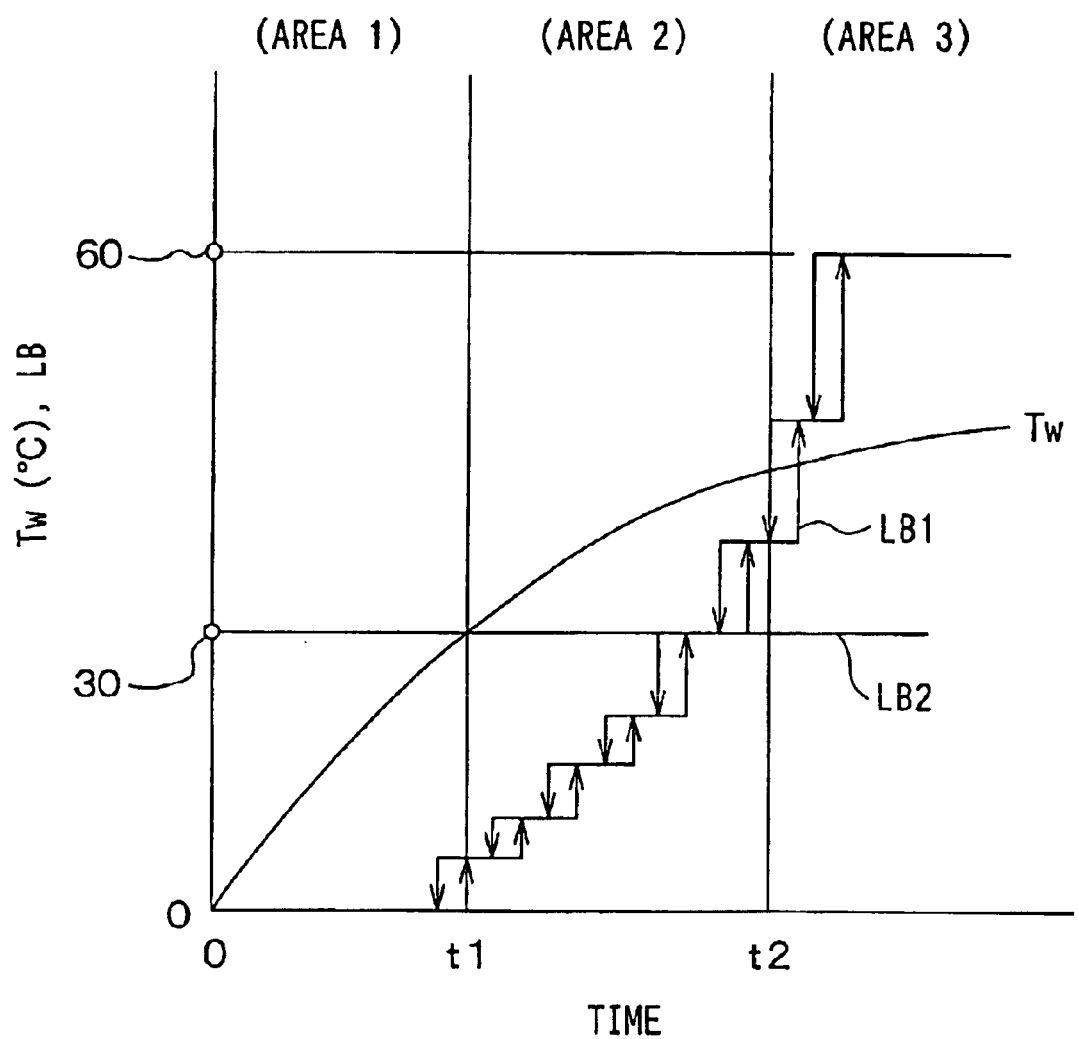
FIG. 6 is a graph showing a relationship between air blowing levels (LB) and time after a start operation of a vehicle engine, and a relationship between a water temperature (TW) and the time, according to the first embodiment.

The warm-up control is shown in FIG. 6. FIG. 6 plots time after the start operation of the vehicle engine as the abscissa, and the air blowing level LB (LB1, LB2) and the water temperature TW as the ordinate. As shown in FIG. 6, when the water temperature TW is equal to or lower than the first predetermined temperature (e.g., 30° C.), the air blowing level LB1 is set at zero (LB1=0). Then, until the water temperature TW increases to be a second predetermined temperature (e.g., 60° C.), the air blowing level LB1 is gradually increased. When the water temperature TW reaches the second predetermined temperature, the air blowing level LB1 is set at the maximum amount. In FIG. 6, time t1 is a time period until the water temperature TW reaches the first predetermined temperature after the start operation of the vehicle engine. Further, the time t2 is a time period until the air blowing level LB1 becomes higher than the air blowing level LB2 after the start operation of the vehicle engine.

When the determination at step S5 is NO (i.e., LB1≠0), the air blowing levels LB1, LB2 are in an area 2 (between time t1 and time t2) shown in FIG. 6. At this time, at step S6, the air blowing mode is selected from the air-conditioning control mode (A/C control mode) in accordance with the target air temperature TAO. On the other hand, when the determination at step S5 is YES (LB1=0), the air blowing levels LB1, LB2 are in an area 1 (between time 0 and time t1) shown in FIG. 6, the shut mode is selected as the air blowing mode at step S7. When the determination at step S3 is NO (LB1>LB2), the air blowing amount of the blower is determined at the air blowing level LB1 at step S8. At this time, the air blowing levels LB1, LB2 are in an area 3 (after time t2) shown in FIG. 6, and the air blowing mode is selected from the air-conditioning control mode (A/C control mode) in accordance with the target air temperature TAO at step S9.

When the determination at step S1 is NO, that is, when the ignition switch is determined not to be turned on at step S1, the control process proceeds to step S10. At step S10, the operation of the vehicle engine (E/G) is stopped, the operation of the blower motor M is stopped, and the operation of the air conditioner (A/C) 1 is stopped.

Next, an air flow due to operation of the air conditioner 1 will be described. When a voltage is applied to the blower motor M and the first and second blower fans 12, 13 operate, air is sucked from the first air suction port 11a, and flows into the first air passage 19a. Further, air is sucked from the second air suction port 11b, and flows into the second air passage 19b. When the air-conditioning mode is selected, air flowing into the first and second air passages 19a, 19b passes through the evaporator 14, and a temperature of the air is adjusted by the air mixing door 15 so that conditioned air is obtained. Then, the conditioned air is blown into the passenger compartment from an opening selected from the openings 11c–11f. Inside air, flowing in the second air passage 19b, is blown to the electronic units 50, 60, 70, without being heat-exchanged in the evaporator 14.

On the other hand, when the shut mode is selected, the outside-air introduction port 17a is closed by the air switching door 18, so that only inside air flows in the first air passage 19a. The inside air, flowing through the first air passage 19a, passes through the evaporator 14, and is blown out from only the cooling opening 11g. In the shut mode, the operation of the refrigerant cycle is stopped, and the hot water circulation in the heater core 16 is stopped, as described above. Therefore, the inside air, passing through the first air passage 19a, is blown from the cooling opening 11g without being heat-exchanged in the evaporator 14 and the heater core 16. Further, the inside air, passing through the second air passage 19b, is blown directly from the cooling opening 11g, without passing through the evaporator 14.

As described above, in the first embodiment, the heat radiation of the electronic units 50, 60, 70 can be facilitated using the air blown by the blower of the vehicle air conditioner 1. Therefore, electronic units having low-temperature resistance can be adopted as the electronic units 50, 60, 70. Further, in the electronic units 50, 60, 70, a size of a heat sink and a size of a dedicated cooling fan can be reduced, or both of the heat sink and the dedicated cooling fan can be eliminated. Furthermore, in the first embodiment, only the inside air, not being cooled by the evaporator, is blown to the electronic units 50, 60, 70. Therefore, the electronic units 50, 60, 70 can be prevented from being excessively cooled. Therefore, surface temperatures of the electronic units 50, 60, 70 can be restricted from being reduced than the dew point. Thus, it can restrict condensed water from being generated on the electronic units 50, 60, 70.

Further, in the first embodiment, the first and second inside-air introduction ports 17b, 11b are provided as the inside-air introduction port, and the first inside-air introduction port 17b and the outside-air introduction port 17a communicate with the passenger compartment through the first air passage 19a. The second inside-air introduction port 11b communicates with the electronic units 50, 60, 70 through the second air passage 19b. Therefore, it can prevent the outside air from entering the second air passage 19b, thereby further restricting the surface temperatures of the electronic units 50, 60, 70 from reducing than the dew point. Thus, it can further restrict condensed water from being generated on the electronic units 50, 60, 70.

In the above-described first embodiment, only inside air is introduced to the cooling opening 11g. However, if at least inside air is blown from the cooling opening 11g, outside air may be introduced to the second air passage 19b. In this case, a ratio of the flow amount of outside air to the flow amount of the whole air flowing through the cooling opening 11g in the second air passage 19b is preferably lower than 50%. That is, the inside air is mainly blown from the cooling opening 11g. Even in this case, the temperature of air blown to the electronic units 50, 60, 70 can be restricted from being excessively reduced.

(Second Embodiment)

The second embodiment will be now described with reference to FIGS. 7–9. In the second embodiment, vehicle cockpit components are modularized to form a function module assembly M1, a structure module assembly M2 and a design module assembly M3. In the second embodiment, the module assemblies M1–M3 are mounted on a vehicle in the arrangement in FIGS. 7–9 in the vehicle front-rear direction, in the vehicle right-left direction and in the vehicle up-down direction.

Figure 7:
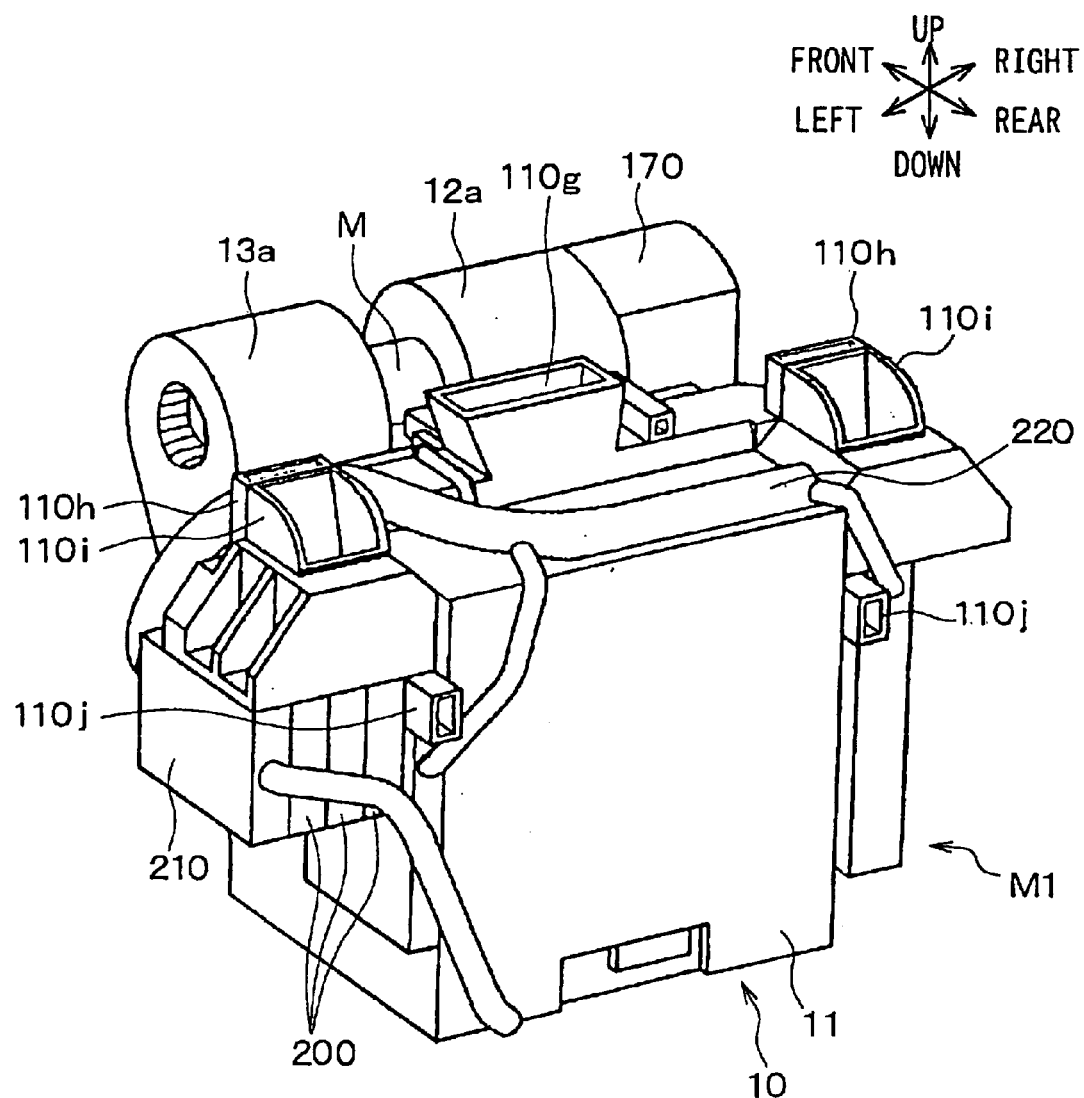
FIG. 7 is a perspective view showing a function module assembly (M1) according to a second embodiment of the present invention.

As shown in FIG. 7, peripheral members 200, 210, 220 are integrally attached to the interior unit 10 (air conditioning unit) to form the function module assembly M1. In the second embodiment, the interior unit 10 has a structure similar to that in FIG. 1 in the above-described first embodiment. Specifically, the peripheral member 200 is a case for containing an electronic control unit, the peripheral member 210 is a junction box, and the peripheral member 220 is an integrated wiring bundle. More specifically, the integrated wiring bundle 220 is formed by integrating plural wire harnesses in bundle shape. The junction box 210 is a housing containing a device for distributing electric power to the integrated wiring bundle 220. The electronic control unit (ECU) controls the operation of the air conditioner and the operation of other electric devices mounted on the vehicle. The air conditioning unit 10 is disposed on at least one of a floor panel and a dash panel, and the peripheral members 200, 210, 220 are supported by the air conditioning unit 10. The dash panel is a metal panel for partitioning a vehicle inner space into an engine compartment and the passenger compartment. A vehicle platform is constructed with the floor panel, the dash panel and the like.

In FIG. 7, air ducts 110g–110j are connected to the interior unit 10 of the vehicle air conditioner shown in FIG. 1. Since the air conditioning unit and the blower unit of the interior unit 10 are described in the first embodiment, its description is omitted in the second embodiment. Among the air ducts 110g–110j, a function center-defroster duct 110g is disposed for connecting the defroster opening 11c shown in FIG. 2 and a design center-defroster duct 510 described later, and a function side-defroster duct 110h is disposed for connecting the defroster opening 11c and a design side-defroster duct 520 described later. Further, a function side-face duct 110i is disposed for connecting the side face opening 11e shown in FIG. 1 and a design side-face duct 530 described later, and a function center-face duct (not shown) is disposed for connecting the center face opening 11d shown in FIG. 1 and a design center-face duct 540 described later. In addition, a cooling duct 110j is disposed to be connected to the cooling opening 11g shown in FIG. 1. Inside air upstream of the evaporator 14 is blown from the cooling opening 11g to the electronic unit such as the meter unit 60 and the display unit 70, through the cooling duct 110. As in the first embodiment, in the second embodiment, the air ducts 110g–110j are integrated to the air conditioning case 11 by resin molding, thereby reducing the number of components.

Figure 8:
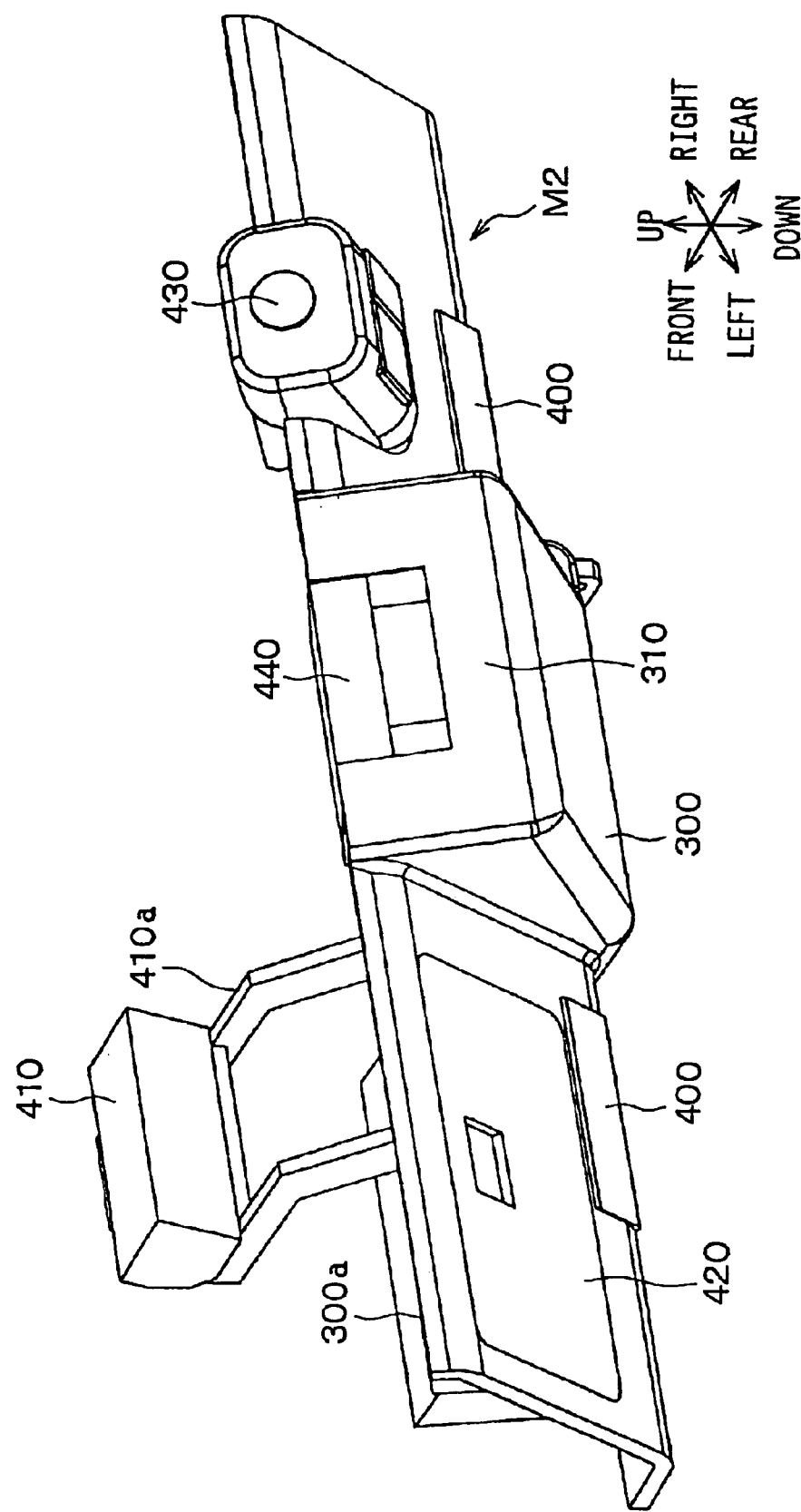
FIG. 8 is a perspective view showing a structure module assembly (M2) according to the second embodiment.

FIG. 8 shows the structure module assembly M2. As shown in FIG. 8, the structure module assembly M2 is modularized with a steering support member 300 for supporting a steering shaft 430, air bag units 400, 410 for protecting a passenger in vehicle collision, and their peripheral members 420, 430, 440.

The steering support member 300 is a metal plate member extending in the vehicle right-left direction (vehicle width direction). Both ends of the steering support member 300 are fixed to and supported by an A pillar by using bolts and the likes, and the air bag units 400, 410 and the peripheral members 420, 430, 440 are supported by the steering support member 300. Since the shape of the A pillar is greatly different for every vehicle type, the steering support member 300 supported by the A pillar is designed to be different for every vehicle type.

Further, the air bag units 400, 410 are required to be supported by a member having a predetermined range strength. Therefore, the air bag units 400, 410 are generally supported by the steering support member 300 having the predetermined range strength. The air bag unit 400 is the knee air bag unit for protecting the knee portion of a passenger, and the air bag unit 410 is a passenger-seat air bag unit for protecting a front-seat passenger on a front-passenger's seat. The air bag units 400, 410 are set in accordance with a condition such as heights of a driver seat and a passenger seat and positions thereof in a vehicle front-rear direction and the vehicle right-left direction. That is, the air bag units 400, 410 are designed for every vehicle type. The passenger-seat air bag unit 410 is attached to and supported by a bracket 410*a* supported by the steering support member 300. The peripheral member 420 is a resinous glove box, and the peripheral member 430 is a metal steering shaft. The peripheral member 440 is an operation panel having an air-conditioning switch for starting the operation of the air conditioner 1.

Figure 9:
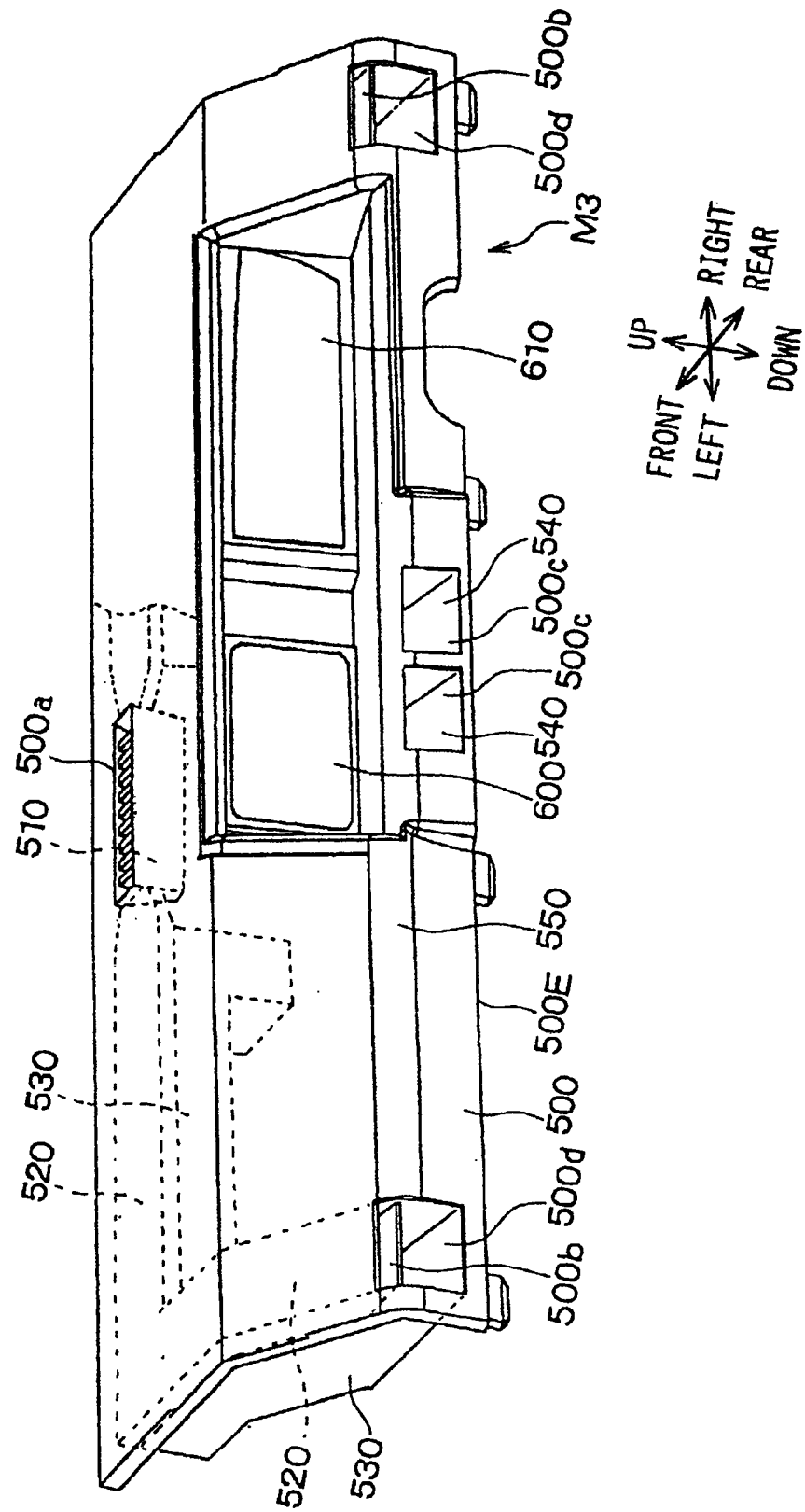
FIG. 9 is a perspective view showing a design module assembly (M3) according to the second embodiment.

As shown in FIG. 9, the design module assembly M3 is modularized with a dashboard part 500, the air ducts 510–540, a display unit 600 and a meter unit 610. For example, the display unit 600 is used for a navigation system, and the meter unit 610 indicates a vehicle speed, a rotational speed of a vehicle engine, a fuel remaining amount and the like. The dashboard part 500 has a center-defroster blowing port 500*a*, aside-defroster blowing port 500*b*, a center-face blowing port 500*c* and a side-face blowing port 500*d*. Conditioned air from the air conditioning unit is blown from the center-defroster blowing port 500*a* to a front windshield, and is blown from the side-defroster blowing port 500*b* to a side windshield. Further, the conditioned air is blown from the center-face blowing port 500*c* and the side-face blowing port 500*d* to the upper half body of the passenger. The air duct 510 is a design center-defroster duct for connecting the function center-defroster duct 10*g* and the center-defroster blowing port 500*a*. The air duct 520 is a design side-defroster duct for connecting the function side-defroster duct 110*h* and the side-defroster blowing port 500*b*. The air duct 530 is a design side-face duct for connecting the function side-face duct 110*i* and the side-face blowing port 500*d*. The air duct 540 is a design center-face duct for connecting the center face opening 11*d* and the center-face blowing port 500*d*.

In the second embodiment, the air ducts 510–540 are integrated to the dashboard part 500 by resin molding, thereby reducing the number of components. The air ducts 510–540 correspond to a first air-conditioning duct in the present invention, and the dashboard 500 of the design module assembly M3 corresponds to an upper dashboard in the present invention. Further, the steering support member 300 of the structure module assembly M2 corresponds to a lower dashboard in the present invention. That is, the dashboard of the second embodiment is constructed with the dashboard part 500 shown in FIG. 9 and the steering support member 300. The steering support member 300 is constructed of a metal plate so as to have strength for sufficiently supporting a steering unit. A design sheet is provided on the metal plate on an inside surface of the passenger compartment, thereby forming a design surface 310 on a lower side of the dashboard. Thus, in the second embodiment, the dashboard is divided to the dashboard part 500 (i.e., upper dashboard) of the design module assembly M3 and the steering support member 300 (i.e., lower dashboard) of the structure module assembly M2. A division surface 300*a* of the lower dashboard (steering support member) 300 and a division surface 500*e* of the upper dashboard 500 are connected together, so that an integrated design surface is formed by an upper design surface 550 of the dashboard part 500 and the lower design surface 310 of the steering support member 300.

Each of the module assemblies M1–M3 is formed in a cockpit-component assembly line different from a vehicle assembly line. Then, the module assemblies M1–M3 are attached to a vehicle in the vehicle assembly line, thereby reducing the number of assembly processes in the vehicle assembly line. In the vehicle assembly line, the module assemblies M1–M3 separated from each other are assembled to the vehicle, respectively. However, in the second embodiment, after the module assemblies M1–M3 are integrated together, the integrated module assembly may be attached to the vehicle in the vehicle assembly line. Alternatively, any two of the module assemblies M1–M3 may be integrated together beforehand. For example, the module assemblies M1, M2 are integrated together to form an integrated module assembly M12, and the integrated module assembly M12 and the module assembly M3 are assembled to the vehicle in the vehicle assembly line.

Similarly to the above-described first embodiment, in the second embodiment, during the air-conditioning control mode, the air blowing mode is selected from a defroster mode, a face mode, a foot mode and the like. Specifically, the defroster mode, conditioned air is blown only from the center-defroster blowing port 500*a* and the side-defroster blowing port 500*b*. In the face mode, the conditioned air is blown only from the center-face blowing port 500*c* and the side-face blowing port 500*d*. In the foot mode, the conditioned air is blown mainly from the foot opening. In the second embodiment, inside air before being cooled in the evaporator 14 (see FIG. 1) can be introduced into the cooling opening 11*g* (see FIG. 1) to cool the electronic units.

As described above, in the second embodiment, the vehicle cockpit components are divided into three parts, and are modularized to form the function module assembly M1, the structure module assembly M2 and the design module assembly M3. The function module assembly M1 is constructed of the air conditioning unit 10 and its peripheral members 200–220, and the structure module assembly M2 is constructed of the steering support member 300, the airbag units 400, 410 and the like. The design module assembly M3 is constructed of the display unit 600, the meter unit 610, the dashboard part 500 and the like. Accordingly, only the design module assembly M3 is required to change its design for every vehicle grade, but the function module assembly M1 and the structure module assembly M2 are not required to be changed for every vehicle grade. That is, the function module assembly M1 and the structure module assembly M2 can be commonly used for many vehicle grades. Further, in some cases, the design module assembly M3 and the structure module assembly M2 are required to be changed for vehicle types, but the function module assembly M1 is not required to be changed for the vehicle types. Thus, the module structure of the vehicle cockpit components can be formed so as to simplify a design change of the module structure. Accordingly, this module structure can improve design-freedom degrees of the cockpit components of the design module structure M3, such as the upper dashboard 500, the display unit 600 and the meter unit 610.

(Third Embodiment)

The third embodiment will be now described with reference to FIGS. 10, 11A, 11B. In the above-described second embodiment, the steering shaft 430 is inserted into an insertion hole provided in the steering support member 300 so as to be supported by the steering support member 300. Further, the steering support member 300 constructs the design surface 310 of the lower dashboard. In the third embodiment, as shown in FIGS. 11A and 11B, a portion of the steering support member 300, for supporting the steering shaft 430, is located below the steering shaft 430. Further, the steering support member 300 is disposed above the dashboard part 500 in invisible from the inside of the passenger compartment. The steering support member 300 is provided in a shape of a pipe extending in the vehicle right-left direction.

The steering support member 300 includes a bracket 320 for supporting the steering shaft 430. A fastening portion 430a of the steering shaft 430 and the bracket 320 are fastened to each other by using fastening bolts 330. Thus, in the third embodiment, the steering support member 300 is disposed below the steering shaft 430, as shown in FIGS. 11A and 11B. Therefore, the meter unit 610 can be disposed at a vehicle front side sufficiently separated from the driver without interfering with the steering support member 300, thereby improving visibility of the meter unit 610. Specifically, in a comparison example of FIG. 10, the meter unit 610 is disposed substantially at a distance of 750 mm separated from an observing point of the driver. However, in the third embodiment of FIG. 11B, the meter unit 610 can be disposed at a distance of 900 mm or longer, separated from the observing point of the driver.

Here, as a distance L1 between the steering support member 300 and a steering wheel 430b is set shorter, vibration of the steering wheel 430b can be reduced. However, as shown in FIG. 10, when the steering support member 300 is disposed above the steering shaft 430, the distance L1 cannot be set sufficiently short. Specifically, in this case, if the steering support member 300 is disposed near the steering wheel 430b, the steering support member 300 interferes with the meter unit 610. On the other hand, in the third embodiment, as shown in FIGS. 11 and 11B, since the steering support member 300 is disposed below the steering shaft 430, the steering support member 300 can be disposed near the steering wheel 430b without interfering the meter unit 610, thereby reducing vibration of the steering wheel 430b.

Figure 10:
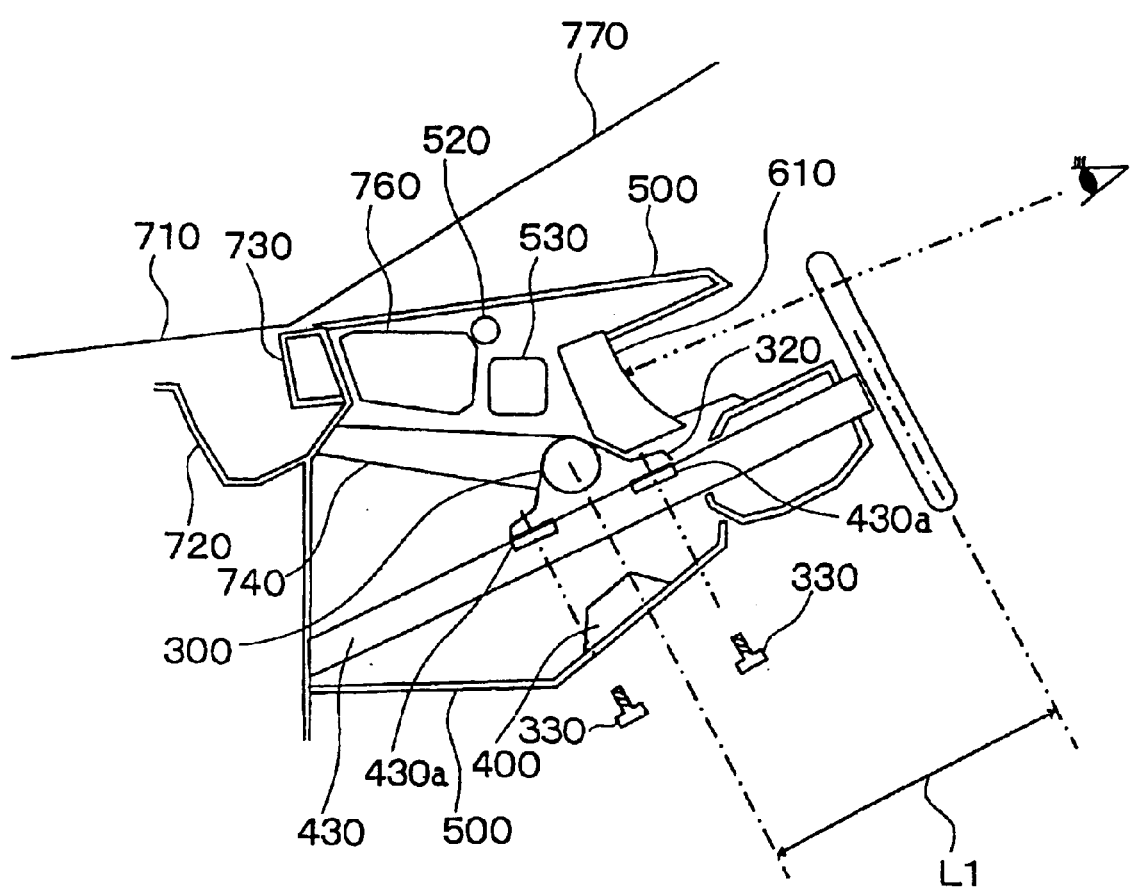
FIG. 10 is a schematic diagram showing a dashboard at a driver seat side and its vicinity, in a comparison example, for explaining a third embodiment of the present invention.
Figure 11A:
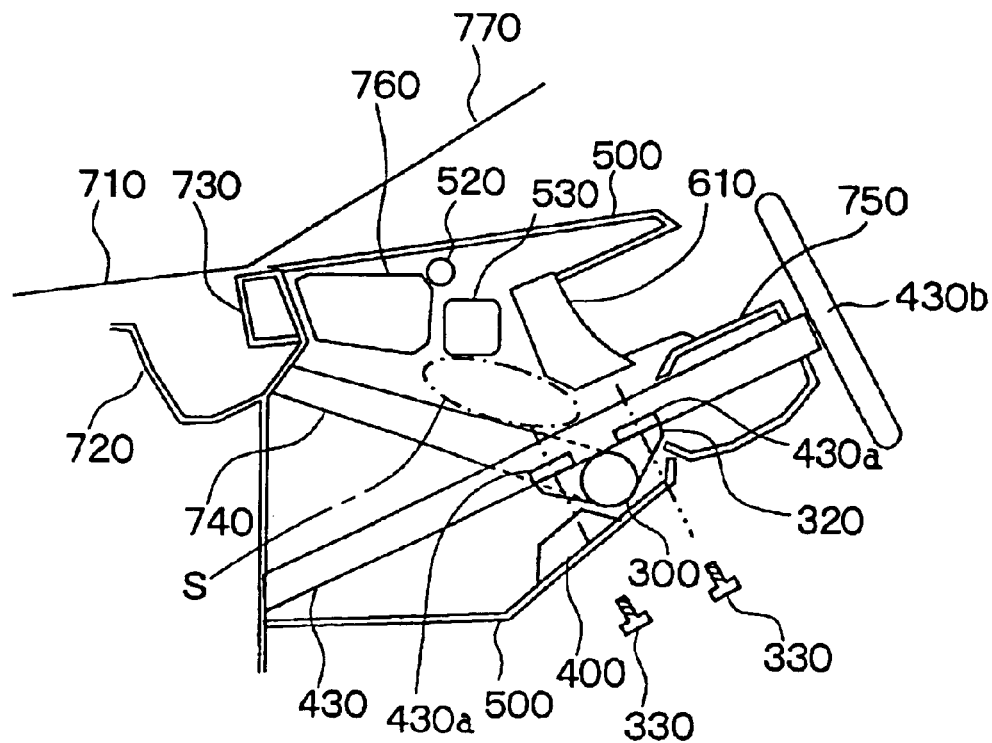
FIG. 11A is a schematic diagram showing a dashboard at a driver seat side and its vicinity in an example of the third embodiment.
Figure 11B:
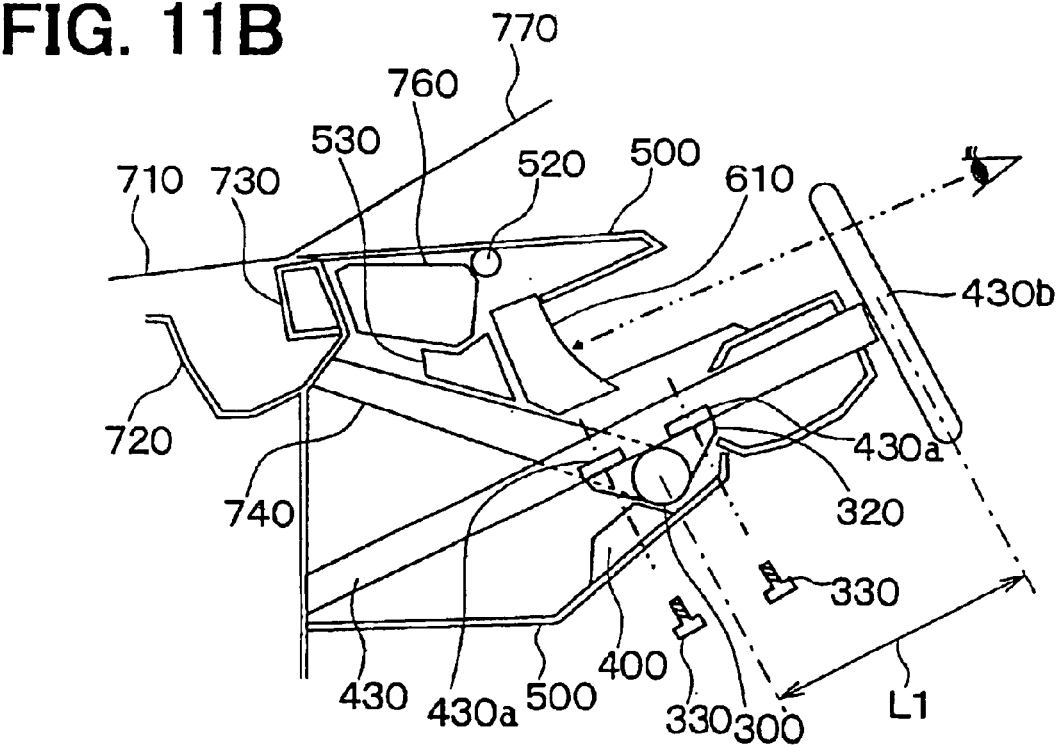
FIG. 11B is a schematic diagram showing a dashboard at a driver seat side and its vicinity in another example of the third embodiment.

In FIGS. 10, 11A, 11B, a cowl 720 having a cowl strengthening member 730 is provided below a bonnet 710. The cowl 720 and the bracket 320 are connected together by a bracket 740. A portion of the steering shaft 430 is covered with a steering column cover 750. Further, a head-up display unit 760 is disposed inside the dashboard part 500 at a vehicle front side of the meter unit 610. Display beams, output from the head-up display unit 760, are transmitted to a transparent portion provided on an upper surface of the dashboard part 500, and are reflected by a front windshield 770. Thus, the display beams are made visible by the driver as a virtual image.

(Fourth Embodiment)

The fourth embodiment will be described with reference to FIGS. 12A, 12B. In the fourth embodiment, as shown in FIG. 12B, a substantially center portion of the steering support member 300 in the vehicle width direction is positioned between the air conditioning case 11 and an audio system 780 disposed substantially at a center in the vehicle width direction, and below an upper end of the audio system 780. The audio system 780 includes an electrical unit such as a radio, a compact disc (CD) player, a mini disc (MD) player, a digital video disk (DVD) player and a navigation unit. Further, operation switches of the electric unit and operation switches of the air conditioning unit 10 (i.e., interior unit 10 of the vehicle air conditioner in FIG. 1) are provided.

Figure 12A:
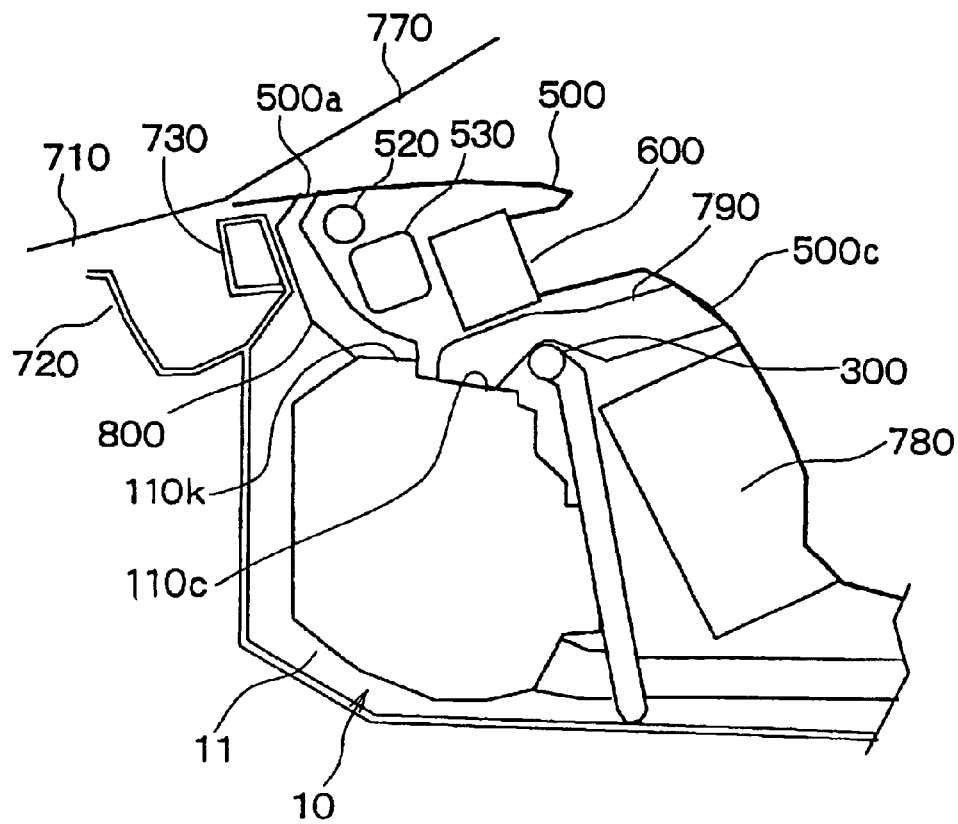
FIG. 12A is a schematic diagram showing a dashboard at a center in a vehicle width direction and its vicinity in a comparison example.
Figure 12B:
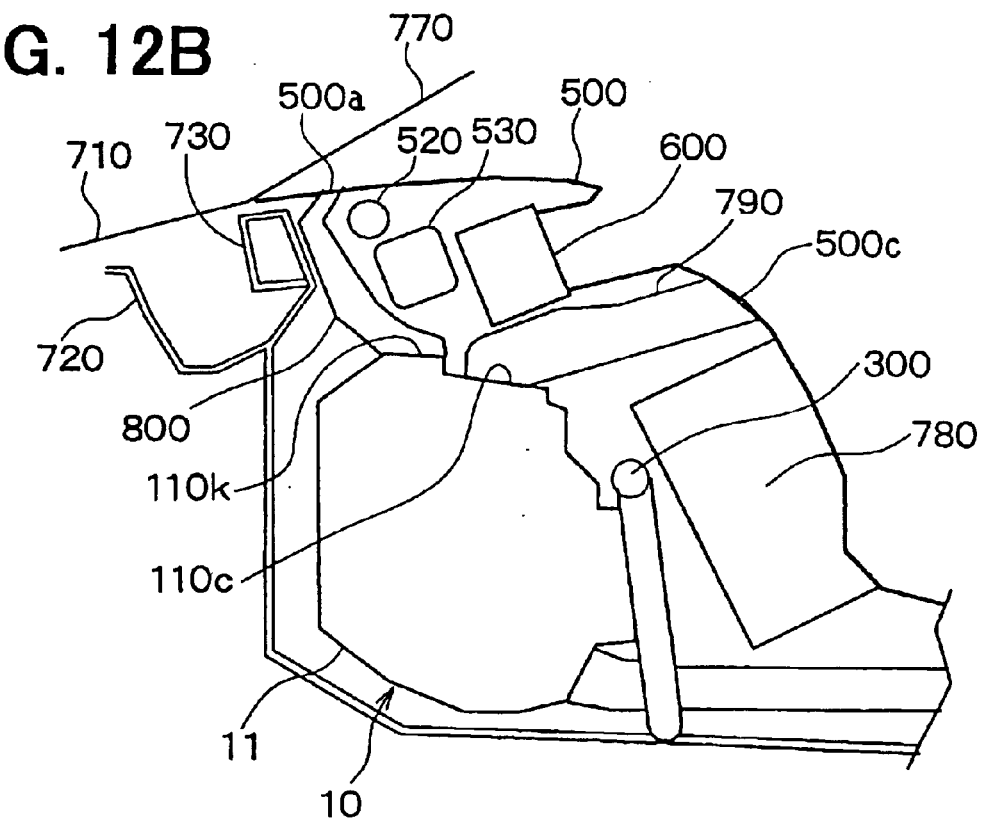
FIG. 12B is a schematic diagram showing a dashboard at a center and its vicinity according to a fourth embodiment of the present invention.

In FIGS. 12A, 12B, a center face duct 790 is disposed for connecting the center face opening 11d of the air conditioning case 11 and the center-face blowing port 500c, and a center defroster duct 800 is disposed for connecting the center-defroster blowing port 500a and a center defroster opening ilk provided on the air conditioning case 11. FIG. 12A shows a comparison example of the fourth embodiment, in which the steering support member 300 is located above the upper end of the audio system 780. In this case, the air passage of the center face duct 790 is partially bent by the steering support member 300. However, in the fourth embodiment, as shown in FIG. 12B, since the steering support member 300 is located below the upper end of the audio system 780, a large space can be ensured between the steering support member 300 and the display unit 600. Therefore, a sufficient air-passage area can be ensured in the center face duct 790 disposed between the steering support member 300 and the display unit 600.

(Fifth Embodiment)

Figure 13A:
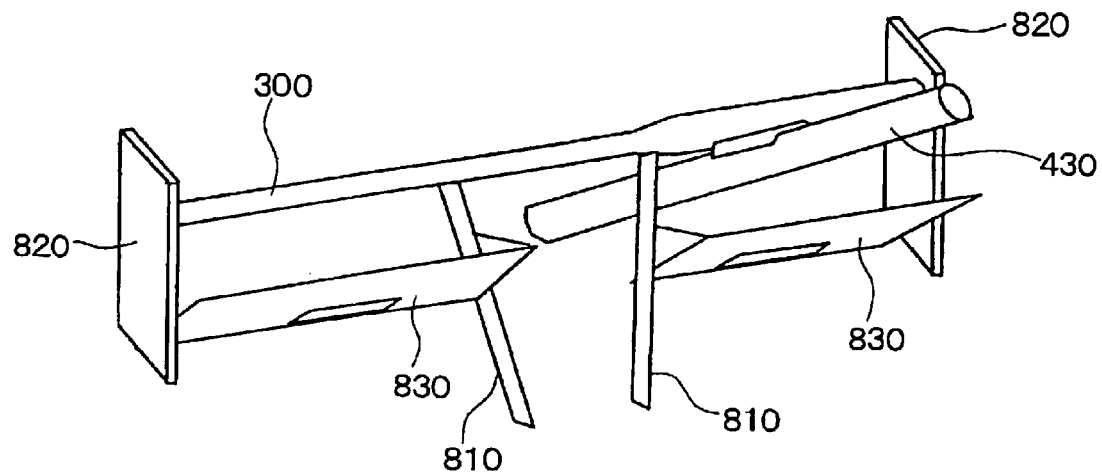
FIG. 13A is a perspective view showing a steering support member and a steering shaft in a comparison example.

The fifth embodiment will be described with reference to FIGS. 13A, 13B. In the above-described second embodiment of the present invention, the steering shaft 430 is supported by the steering support member 300 while being inserted into the insertion hole provided in the steering support member 300. In the fifth embodiment, as shown in 13B, the steering support member 300 is disposed below the steering shaft 430 to support the steering shaft 430, and is provided so as to extend in the vehicle right-left direction. Here, the knee air-bag unit 400 is required to be attached to a metal bracket 830 so as to absorb a mechanical shock at explosive expansion of its air bag. As shown in FIG. 13A, when the steering support member 300 is located above the steering shaft 430, the knee air-bag unit 400 is located to be separated from the steering support member 300. In this case, the metal bracket 830 is required to be supported by a brace member 810 and a side bracket 820. Therefore, the size of the bracket 830 and the weight thereof are increased.

Figure 13B:
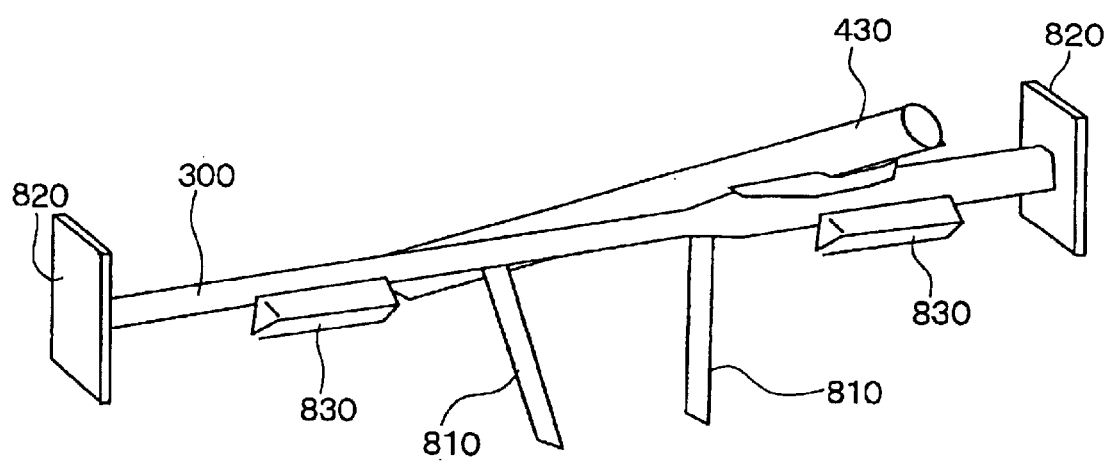
FIG. 13B is a perspective view showing a steering support member and a steering shaft according to a fifth embodiment of the present invention.

In the fifth embodiment, as shown in FIG. 13B, because the steering support member 300 is located below the steering shaft 430, the knee air-bag unit 400 can be disposed near the steering support member 300. Therefore, the bracket 830 can be attached directly to the steering support member 300, thereby reducing the size and weight of the bracket 830. Here, the brace member 810 is a metal member for supporting the steering support member 300 at its lower side. Further, the side bracket 82 is attached to both ends of the steering support member 300, and is fixed to a vehicle body by using bolts and the likes.

(Sixth Embodiment)

The sixth embodiment of the present invention will be now described with reference to FIG. 14.

In the above-described second embodiment of the present invention, the bracket portion into which the steering shaft 430 is inserted is separated from the steering support member 300. In the sixth embodiment, as shown in FIG. 14, an insertion hole 300b is provided in the steering support member 300. In this case, the steering shaft 430 is inserted into the insertion hole 300b, and is supported directly by the steering support member 300.

(Seventh Embodiment)

Figure 15:
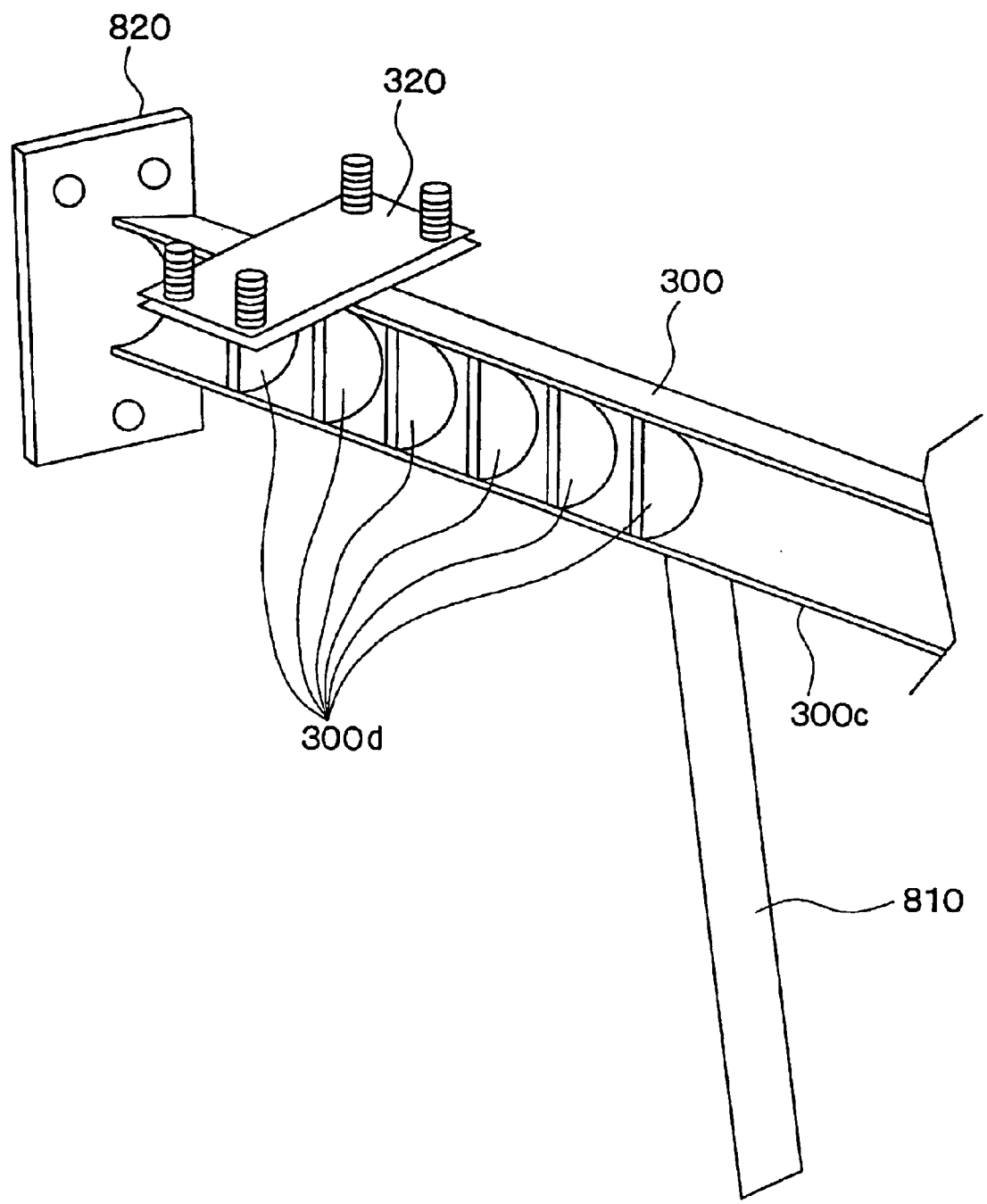
FIG. 15 is a perspective view showing a steering support member according to a seventh embodiment of the present invention.

The seventh embodiment of the present invention will be now described with reference to FIG. 15.

In the above-described second embodiment, the steering support member 300 is formed by the pipe extending in the vehicle width direction. However, in the seventh embodiment, the steering support member 300 is formed by a plate member extending in the vehicle width direction. The plate-like steering support member 300 has an opening 300c opened in a vehicle front-rear direction (perpendicular to the vehicle width direction). The steering support member 300 positioned substantially between the brace member 810 and the side bracket 820 at the diver's seat side is reinforced by reinforcement ribs 300d. Each of reinforcement ribs 300d is a plate member extending vertically to be perpendicular to the vehicle width direction. The plural reinforcement ribs 300d are provided in the opening 300c of the steering support member 300.

The steering support member 300 at the front-passenger's seat side is required to be located above the air bag unit 410, in some cases, in order prevent interfering between the steering support member 300 and the air bag unit 410. Further, the steering support member 300 at the center area is desired to be located below the upper end of the audio system 780 in many cases as in the fourth embodiment. The steering support member 300 at the driver seat side is desired to be located below the steering shaft 430 in many cases as in the fourth embodiment. Thus, if each portion of the steering support member 300 is located as described above, the portions of the steering support member 300 are located at positions different from each other in the up-down direction. That is, the steering support member 300 bends in the up-down direction. However, in the seventh embodiment, the steering support member 300 is formed by the plate member having the opening 300c penetrating through the steering support member 300 in the vehicle front-rear direction. Therefore, the steering support member 300 can be readily formed by metal die-casting, and different positions of the steering support member 300 can be readily set.

(Other Embodiments)

Although the present invention has been fully described in connection with the preferred embodiments thereof with reference to the accompanying drawings, it is to be noted that various changes and modifications will become apparent to those skilled in the art.

For example, in the interior unit 10 of the vehicle air conditioner according to the above embodiments, the fan casings 12a, 13a and the air switching case 17 are integrated to the air conditioning case 11. However, the fan casings 12a, 13a can be separated from the air conditioning case 11, or the air switching case 17 may be separated from the air conditioning case 11. In the above embodiments, the first and second blower fans 12, 13 are driven by the common blower motor M. However, the first and second blower fans 12, 13 may be driven by dedicated electric motors, respectively.

Although the blower includes the first and second blower fans 12, 13 in the above embodiments, the blower may include a single blower fan. In this case, a space in the fan casing is partitioned into two spaces by a partition plate, and the two spaces communicate with the first air passage 19a and the second air passage 19b, respectively. The first air passage 19a communicates with the second air passage 19b through a clearance between the partition plate and the single blower fan. However, in the above embodiments, because the blower includes two blower fans 12, 13, the above clearance can be eliminated, thereby accurately preventing outside air from entering the second air passage 19b.

In the above-described first embodiment, the first inside-air introduction port 17b and the outside air introduction port 17a communicate with the passenger compartment through the first air passage 19a provided upstream from the evaporator 14 in the air conditioning case 11. Further, the second inside-air introduction port 11b communicates with the electronic units 50, 60, 70 and the passenger compartment through the second air passage 19b provided upstream from the evaporator 14 in the air conditioning case 11. However, a single air passage may be provided upstream from the evaporator 14 in the air conditioning case 11, in place of the first and second air passages 19a, 19b partitioned from each other. For example, in a centrifugal-type blower, when air is sucked from a suction port around a nose portion of the fan casings 12a, 13a having a scroll shape, the sucked air is blown out from a blowing port near the suction port. On the other hand, when air is sucked from a suction port far from the nose portion, the sucked air is blown out from a blowing port away from the suction port. If this characteristic of the centrifugal-type blower is used, a single air passage can be provided upstream from the evaporator, in place the first and second air passages 19a, 19b. In this case, the air conditioning case 11 can be constructed so that at least inside air can be blown out from the cooling opening 11g.

In the above-described second to seventh embodiments, the steering support member 300 is made of metal. However, for example, the steering support member 300 may be made of resin, without being limited to metal. In the second to seventh embodiments, the steering support member 300 extends in the vehicle width direction, and both the ends thereof are fixed to A pillar, so that the steering support member 300 functions as a reinforcement member of the vehicle body. However, when the steering support member 300 has only strength for supporting the steering unit, both the ends of the steering support member 300 are not required to be fixed to the A pillar. Further, the steering support member 300 may be formed by a bar member, without being limited to the pipe member and the plate member in the second to seventh embodiments. The steering support member 300 may be made of at least one of aluminum alloy and a magnesium alloy. Alternatively, the steering support member 300 may be constructed with a metal portion for supporting the steering shaft, and a resin portion that is the other part of the metal portion in the steering support member 300. Further, the support member 300 may be disposed to support at least one of a side bracket for fixing the steering support member to a vehicle body, a brace for supporting the steering support member from below, a brake pedal, an accelerator pedal and a clutch pedal.

In the function module assembly M1 according to the second to seventh embodiments, the container case 200 and the junction box 210 are integrated to the air conditioning case 11 by resin molding. However, the present invention is not limited to this manner.

Further, the above-described second through seventh embodiments, the interior unit 10 (air conditioning unit) of the vehicle air conditioner can be a structure different from that of the above-described first embodiment of the present invention.

Such changes and modifications are to be understood as being within the scope of the present invention as defined by the appended claims.

What is claimed is:

1. A module structure of vehicle cockpit components, comprising:
 a function module assembly formed by modularizing an air conditioning unit and a peripheral member of the air conditioning unit, the air conditioning unit being for adjusting an air temperature and for blowing the adjusted air into a passenger compartment of the vehicle;
 a structure module assembly formed by modularizing a steering support member for supporting a steering shaft disposed at a driver seat side of the vehicle, and an air bag unit for protecting a passenger in a vehicle collision disposed at a passenger seat side of the vehicle spaced from the driver seat side; and
 a design module assembly formed by modularizing a dashboard and at least one of a display unit and a meter unit in the vehicle; wherein
 the dashboard of the design module assembly includes a center-face blowing port and a side-face blowing port.

2. The module structure according to claim 1, wherein the steering support member is supported by a vehicle A-pillar.

3. The module structure according to claim 1, wherein:
the dashboard is an upper dashboard of the vehicle;
the structure module assembly is modularized with a lower dashboard part of the vehicle;
the upper dashboard part and the lower dashboard part are connected to form a design surface in the passenger compartment when the design module assembly and the structure module assembly are assembled to the vehicle;
the upper dashboard part defines an upper portion of the design surface; and
the lower dashboard part defines a lower portion of the design surface.

4. The module structure according to claim 3, wherein the lower dashboard part is disposed to be used as the steering support member.

5. The module structure according to claim 1, wherein the design module assembly is modularized with an air-conditioning duct, through which conditioned air from the air conditioning case flows into the passenger compartment.

6. The module structure according to claim 1, wherein the air bag unit is at least one of an upper air-bag unit for protecting the upper body of a passenger on a front seat and a knee air-bag unit for protecting the knee portion of the passenger.

7. The module structure according to claim 1, wherein at least any one of the steering shaft and a glove box is modularized with the structure module.

8. The module structure according to claim 1, wherein the peripheral member is at least one of a container case for containing an electronic control unit, a junction box, a wire harness and an air-conditioning duct.

9. The module structure according to claim 1, wherein:
the air conditioning unit includes a resinous air conditioning case for defining an air passage therein;
the peripheral member is at least one of a container case for containing an electronic control unit and a junction box; and
at least one of the container case and the junction box is integrated to the resinous air conditioning case by resin molding.

10. The module structure according to claim 1, wherein the steering support member has a support portion for supporting the steering shaft, and the support portion is disposed below the steering shaft.

11. The module structure according to claim 1, wherein:
the steering support member has an insertion hole into which the steering shaft is inserted; and
the steering shaft is inserted into the insertion hole to be supported by the steering support member.

12. The module structure according to claim 1, wherein the steering support member has a center portion substantially at a center area in a vehicle width direction, and the center portion of the steering support member is located below an upper end of an audio system disposed substantially at a center in the dashboard in the vehicle width direction.

13. The module structure according to claim 1, wherein the steering support member includes a pipe member extending in a vehicle width direction.

14. The module structure according to claim 1, wherein the steering support member is a plate member extending in a vehicle width direction and having an opening opened in a direction perpendicular to the vehicle width direction.

15. The module structure according to claim 14, wherein the steering support member has reinforcement ribs that are provided in the opening to extend in a direction perpendicular to the vehicle width direction.

16. The module structure according to claim 1, wherein the steering support member is made of at least one of an aluminum alloy and a magnesium alloy.

17. The module structure according to claim 16, wherein the steering support member is formed by die-casting.

18. The module structure according to claim 1, wherein the steering support member includes a metal portion for supporting the steering shaft, and a resin portion that is the other part of the metal portion in the steering support member.

19. The module structure according to claim 1, wherein the steering support member supports at least one of a side bracket for fixing the steering support member to a vehicle body, a brace for supporting the steering support member from below of the steering support member, a brake pedal, an accelerator pedal and a clutch pedal.

20. The module structure according to claim 1, wherein the steering support member has a fastening member which is fasted to the steering shaft from a lower side of the steering shaft.

21. The module structure according to claim 1, wherein the structure module assembly includes a steering column cover which covers a part of the steering shaft.

22. The module structure according to claim 1, wherein:
the design module assembly includes both of the display unit and the meter unit; and
the display unit is disposed at a vehicle front side of the meter unit.

23. The module structure according to claim 13, wherein:
the steering shaft is disposed to contact the pipe member; and
the steering support member further has a fastening member through which the pipe member is fastened to the steering shaft.

24. The structural module according to claim 1, wherein the structure module assembly extends across both the driver seat side and the passenger seat side of the vehicle.

25. The structural module according to claim 24, wherein the design module assembly extends across both the driver seat side and the passenger seat side of the vehicle.

26. The structural module according to claim 1, wherein the dashboard defines a finished surface directly exposed to the passenger compartment of the vehicle.

* * * * *